March 4, 1930.  J. VAN ITEM  1,749,249
HANDLING AND TRANSPORT OF BUILDING BLOCKS AND THE LIKE
Filed Aug. 8, 1927
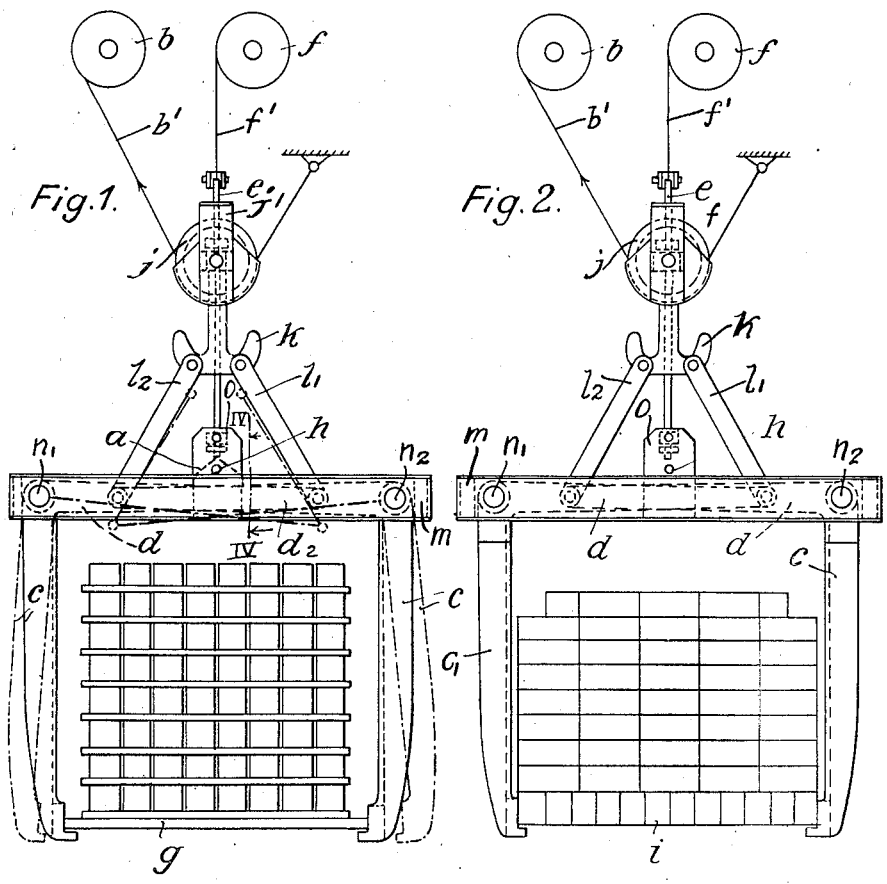
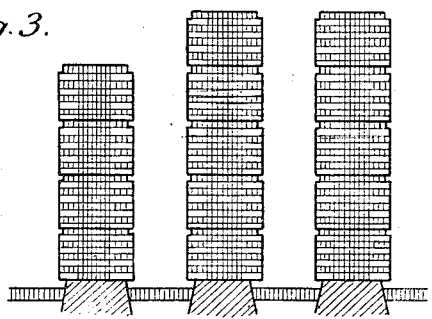
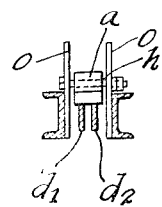
Inventor:

Patented Mar. 4, 1930

1,749,249

UNITED STATES PATENT OFFICE

JOHAN VAN ITEM, OF BREMEN, GERMANY

HANDLING AND TRANSPORT OF BUILDING BLOCKS AND THE LIKE

Application filed August 8, 1927, Serial No. 211,576, and in Germany November 30, 1926.

For handling freshly pressed and rammed slag blocks a method has been proposed, in which by suitable stacking a considerable amount of space may be saved and by suitable transporting and conveying means a great saving in wages may be effected and by both these means and by modifications in the working process considerable economies may be realized.

The present invention has for its object further to improve on these advantages and considerably to extend the applicability of the underlying idea, namely, economy in the manufacture of slag blocks.

It is desirable to stack and transport the buiding blocks, after they have become sufficiently hard, entirely without supports. The great number of boards and supports required hitherto entailed an outlay which was very considerable, more particularly for a new firm; and even in the case of old-established firms of the kind in question it will happen that, when there is a drop in sales, great stocks of blocks will accumulate and that, when there is a demand again, great deliveries and shipments have to be carried out in as short a time as possible. There are, however, other cases in which the use of boards or other supports is in any case undesirable, as for instance when slag bricks, sand lime bricks or tiles are to be treated with impregnating means. In this case the supports not only take up a great deal of space in the impregnating cylinder, but the bricks would adhere to them. The importance of the present invention resides, however, more particularly in the very great advantages resulting from costly transport and repeated stacking of the bricks by hand being done away with. Hitherto it has for instance been necessary, when impregnating blocks, to place them by hand in the impregnating cylinder and, after being sufficiently soaked, to remove them one by one and place them on a conveyor device, from which they must subsequenty be removed again by hand and stacked. Similarly the loading on carts or railway trucks had to be done by hand.

According to the present invention the blocks after leaving the support or the press or oven are stacked loosely (with air spaces) or closely to form a staple, say in the manner shown in Fig. 2 or 3, and are conveyed away in this state to the places where they are to be treated (for instance, the impregnating cylinder), to the stock, or to be loaded. The form of the staple is shown in Figs. 2 and 3. In forming it the bottom layer of blocks are laid cose together, while the layers lying on them are stacked loosely or closely, according to requirement or as desired. The top layer, however, as shown in the drawings, is offset, in order that the lifting tackle used can take hold of the staple lying above it. A number of such staples may be stacked one on the other, as shown more particularly in Fig. 3.

The lifting tackle is a combined lifting and gripping tongs actuated by an automatic grab winch, which is adapted not only for gripping and moving the staple according to Figs. 2 and 3, but also for lifting and moving staples of blocks with supports.

In the latter case (Fig. 1) in which the lifting tackle only acts as a lifting tongs, means must be provided for preventing a too great pressure being exercised on the support, in order that the latter shall not bend or break, while in the other case (Fig. 2) the bottom layer of bricks must be held together by a strong pressure exercised by the tongs.

A constructional example of the invention is shown in the accompanying drawing, in which Fig. 1 shows the lifting tackle in the form of lifting tongs for lifting a staple with its support in front elevation, Fig. 2 the lifting tackle in the form of lifting and gripping tongs for lifting a staple without support, in front elevation, Fig. 3 the arrangement of a staple, and Fig. 4 a detail in cross-sectional elevation on the line IV—IV in Fig. 1.

In the gripping and lifting tackle illustrated in Figures 1 and 2, a rope or the like $b'$ coiled round a lifting drum $b$ passes round a pulley $j$ mounted in a pulley block $j'$, having a downward extension $k$, to which are pivoted two arms $l_1$ and $l_2$. To the lower ends of the arms $l_1$ and $l_2$ are respectively pivoted the upper limbs $d_1$ and $d_2$ of the gripping tongs. Each jaw of the gripping tongs consists of a lower limb, $c_1$ or $c_2$, which normally occupies an approximately vertical position, and of the upper limb $d_1$ or $d_2$ already mentioned, which normally occupies an approximately horizontal position. The two limbs of each jaw are rigidly connected with one another to form a bell-crank lever, and the two bell-crank levers are pivoted to a transverse bar $m$ at $n_1$ and $n_2$ respectively. The transverse bar $m$, which may advantageously be in the form of a box girder, is supported through the medium of a pair of cheeks $o$ and a pull rod $e$ from a rope or the like $f'$ coiled round a drum $f$.

The gripping device can be raised or lowered as a whole, with the tongs open, as shown in dot-and-dash lines in Figure 1, by rotating the drum $f$, the drum $b$ being rotated at the same time but without exerting any more pull on the rope $b'$ than is necessary to prevent it from becoming slack. In order to raise a pile of blocks, however, after the tackle has been lowered into position by means of the drum $f$ with the tongs open, a pull is exerted upon the rope $b'$ by rotating the drum $b$, and the lower limbs $c_1$ and $c_2$ are thereby brought into engagement with the support $g$, as shown in full lines in Figure 1, or with the opposite lower edges of the bottom layer of blocks $i$, as shown in Figure 2. The load is then raised by rotating the drum $f$, the drum $b$ also being rotated at the same time in order to keep the rope $b'$ in a constant state of tension for the purpose of keeping the tongs firmly closed.

An arresting block $a$ is mounted by means of a bolt $h$ between the cheeks $o$ in such a position as to form an abutment for the limbs $d_1$ and $d_2$ when the lower ends of the limbs $c_1$ and $c_2$ come into contact with the edges of the support $g$, so as to prevent the support $g$ from being crushed. When a pile of blocks is being lifted without a support, however, as shown in Figure 2, such an abutment would be a disadvantage, as a considerable inward pressure upon the blocks $i$ is necessary in order to keep the pile intact. The abutment block $a$ is therefore either removed entirely, by releasing the bolt $h$, or is rotated round the bolt $h$ into such a position that the limbs $d_1$ and $d_2$ do not touch it when the limbs $c_1$ and $c_2$ are in contact with the blocks $i$.

The tongs are opened in the following manner:—

The pull rod $e$, which is actuated by the drum $f$, is held in position by the emptying brake, and the lifting drum $b$ is unwound; by the running block $j'$ being lowered, the limbs $c_1$ and $c_2$ of the tongs are forced apart, as shown in dot-and-dash lines.

Having now described my invention, what I claim as new and desire to secure by Letters Patent is:—

1. Lifting tackle for handling and transporting moulded building blocks such as slag bricks, sand lime bricks, tiles, paving blocks and the like, comprising a pair of pivotally mounted jaws, means for rocking the jaws about their pivots towards and away from one another to engage and disengage a load, and an arresting block for limiting the motion of the lower ends of the jaws towards each other, when the lifting tackle is used for lifting without gripping, as and for the purpose set forth.

2. Lifting tackle for handling and transporting moulded building blocks, such as slag bricks, sand lime bricks, tiles, paving blocks and the like, comprising a substantially horizontal bar, two bell-crank levers pivoted to the said bar near its ends, each bell-crank lever consisting of a downwardly extending jaw which is normally approximately vertical and an inwardly extending arm which is normally approximately horizontal, the lower ends of the two jaws being adapted to engage opposite bottom edges of a load, means for lifting the load by applying an upward force to the horizontal arms of the bell-crank levers and thereby causing the jaws to exert a gripping action on the bottom edges of the load, a stop removably mounted on the horizontal bar and adapted to limit the upward movement of the horizontal arms about their pivots and thereby to limit the gripping force of the jaws when the tackle is to be used for lifting without gripping, and means for raising the horizontal bar relatively to the load-lifting means and thereby opening the jaws.

In testimony whereof I have signed my name to this specification.

JOHAN VAN ITEM.